United States Patent [19]

Woodruff

[11] Patent Number: 4,799,767

[45] Date of Patent: Jan. 24, 1989

[54] HIGH SPEED SHUTTER FOR A LASER BEAM

[75] Inventor: David C. Woodruff, Santa Clara, Calif.

[73] Assignee: NM Laser Products, Inc., Sunnyvale, Calif.

[21] Appl. No.: 177,952

[22] Filed: Apr. 5, 1988

[51] Int. Cl.$^4$ .............................................. G02B 26/02
[52] U.S. Cl. ................................... 350/269; 250/498.1
[58] Field of Search ....................... 350/266, 269, 270; 250/229, 498.1

[56] References Cited

U.S. PATENT DOCUMENTS

| | | | |
|---|---|---|---|
| 3,553,364 | 1/1971 | Lee | 350/269 |
| 3,619,037 | 11/1971 | Pugh, Jr. | 350/269 |
| 4,070,099 | 1/1978 | Swift et al. | 350/269 |
| 4,082,435 | 4/1978 | Zeitz | 350/269 |
| 4,103,261 | 7/1978 | Carr | 332/7.51 |
| 4,202,602 | 5/1980 | Torres | 350/272 |
| 4,208,103 | 6/1980 | Kalt et al. | 350/269 |
| 4,257,017 | 3/1981 | Bradley et al. | 332/7.51 |
| 4,332,450 | 6/1982 | Griffith | 354/234 |
| 4,415,231 | 11/1983 | Kaczensky et al. | 350/269 |

*Primary Examiner*—John K. Corbin
*Assistant Examiner*—P. M. Dzierzynski
*Attorney, Agent, or Firm*—Thomas Schneck

[57] ABSTRACT

A shutter mechanism having an electromagnet and a flexible ferromagnetic blade mounted in narrow V-shaped relationship to one another at an end opposite from a light source, with a light path passing between the two. The electromagnet has a cylindrical core with a lengthwise slice defining poles and a toroidal wire winding about the core. When the magnet is activated, the free end of the blade flexes toward the poles completing the magnetic circuit, and either opening or closing the shutter. In a normally open embodiment, the light path passes between the magnetic poles, and the blade, normally parallel to the beam path, flexes downward to block the beam. In a normally closed embodiment, when the blade flexes the light path passes through a slot in a backup plate against which the blade normally rests. The normally closed embodiment includes a light absorptive tongue between the poles which combines with the reflective blade to define a light trap. In the normally open embodiment, the blade combines with a light absorptive slotless backup plate to define the light trap.

10 Claims, 3 Drawing Sheets

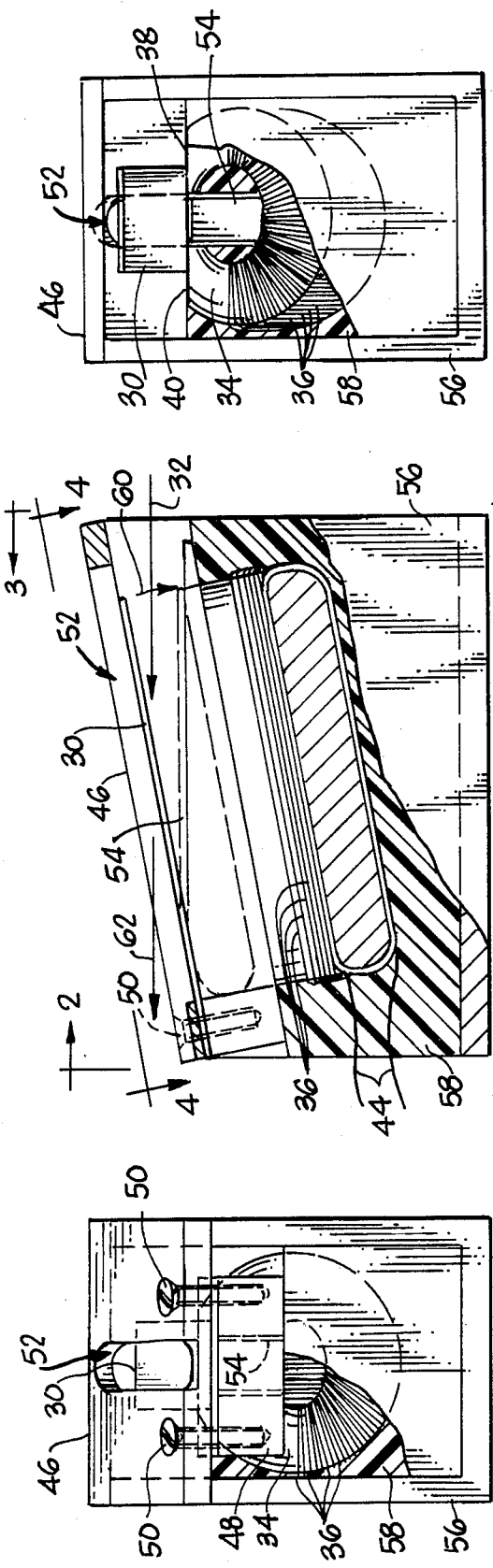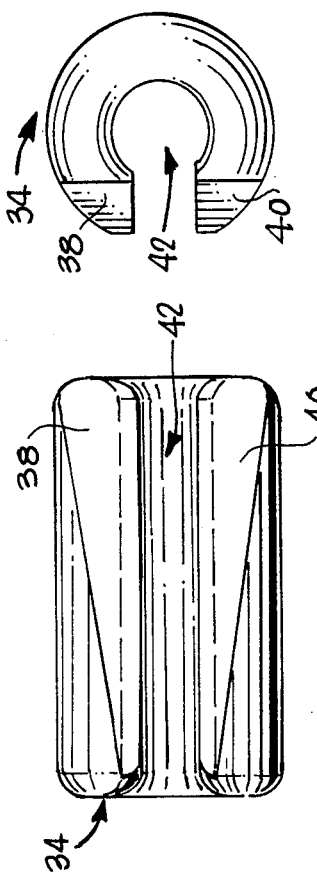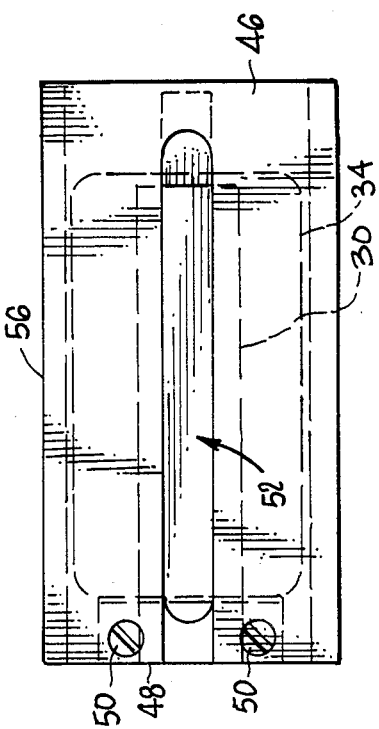

HIGH SPEED SHUTTER FOR A LASER BEAM

DESCRIPTION

TECHNICAL FIELD

The present invention relates to shutter mechanisms for laser beams, and in particular to shutters which are electromagnetically operated.

BACKGROUND ART

With reference to FIG. 11, a shutter mechanism of the prior art includes a very thin flexible steel foil 12 which may be deflected into a beam path 14 by an electromagnet 16. The foil 12 is attached at one end to a collar 18 by retaining screws 20 and lies parallel and below the beam path 14 when the electromagnet is inactive. The electromagnet 16 comprises a ferrite core 22 surrounded by a magnetic winding 24 on a pancake bobbin. In operation, the winding 24 is energized, activating the magnet 16 and causing the free end 26 of the foil 12 to be attracted to the magnet 16 and move upward. As the end 26 intercepts the laser beam path 14, the beam is reflected away from the path 14 by a few degrees. The angle of reflection increases as the foil end 26 approaches the magnet 16. In the full closed position seen in the drawing, the foil 12 conforms flat near magnet 16, bends sharply down to the retaining screws 20 and intercepts the laser beam at a 50 to 60 degree incidence angle. A heat sink 25 removes heat generated by electromagnet 16.

The very thin foil 12 is not only extremely flexible, allowing it to bend into an "S" shape when blocking the beam, but also has low mass which aids in reducing vibration caused by the collision of the foil 12 and the electromagnet 16. This is an advantage because the attenuator or shutter is commonly fitted over cylindrical housings standard for helium-neon and other gas lasers, and any vibration is easily coupled. However, the thin foil is inherently weak, especially at stress points in the "S" shaped bend and at notched cutouts for the retaining screws 20. The lifetime of foil 12 is about 100,000 cycles before breakage occurs, limiting its use to low speed on/off operation. Thermally, the thin foil is not capable of conducting away sufficient heat arising from absorption of high power laser light, but is suitable for low power laser attenuation.

The foil 12 reflects the light beam at an angle near that of the unaltered beam path 14. Thus, an unwanted stray reflection line appears at the target plane of the laser beam as the foil end 26 begins to intercept the beam. It occurs from initial interception until the foil 12 flattens against the electromagnet 16. Since the reflection is at a very narrow angle with respect to the unaltered beam path 14, the reflection cannot be eliminated in the device, but must be "trimmed off" somewhere between the attenuator and the target plane. For low speed on/off operation this poses little problem. But cycling the attenuator or shutter in a high speed pulse operation would produce a large continuous "streak" reflection which is unacceptable. Further, even in low speed operation, the orientation of the foil in the fully closed "S" shape allows laser light to be scattered back into the laser. This back scattering is undesirable in applications such as interferometry.

An object of the present invention is to produce a laser beam shutter mechanism having long life and no stray reflection so as to be suitable for high speed pulse operation.

Another object of the present invention is to produce a shutter mechanism suitable for use with high power lasers and sources.

DISCLOSURE OF THE INVENTION

The above objects have been met with a shutter mechanism having a stiff ferromagnetic blade mounted at an end opposite from a light source in a V-shaped relationship with the poles of an electromagnet with the light path of a laser beam passing between. The electromagnet has a cylindrical core with a lengthwise, i.e. axial, slice defining poles, and has a toroidal winding around the core communicating with an electrical power supply. The blade is flexible so that when the electromagnet is activated, the free end of the blade flexes toward the surface of the magnetic poles.

In one embodiment, the light path coincides with a gap defined between the poles of the electromagnet. The shutter is normally open. When the electromagnet is activated the blade flexes toward the poles trapping the beam. The embodiment also has a light absorptive plate lying parallel to the beam path against which the blade rests when the electromagnet is inactive and which absorbs the light reflected from the blade when the blade traps the beam. The plate forms a thermal sink, which together with a blade retainer, housing and thermal epoxy around the electromagnet dissipate heat.

In another embodiment, the blade normally lies at an angle across the beam path and rests against a backup plate with a lengthwise slot cutout therein. The shutter is normally closed. When the electromagnet is activated, the blade flexes out of the way of the beam path allowing the beam to pass through the slot cutout. A light absorptive tongue is disposed between the poles of the electromagnet to absorb light reflected by the blade in the closed position. A blade retainer, shutter housing and thermal epoxy dissipate heat.

The shutter blade intercepts the beam at grazing incidence and may be coated for enhanced reflectance. Since the beam enters the shutter from the end opposite the "V" mount, the blade and light absorptive plate or tongue traps the beam in a true light trap. There is no stray reflection and no back scattering. The stiff blade acting as a cantilever spring has exceptionally long life. Both magnetic heat sources and optical absorption heat are well channeled permitting its use with high power laser sources. The cylindrical toroidal configuration of the magnet uses the blade as an essential part of the magnetic circuit and is efficient for high speed modulation.

BRIEF DESCRIPTION OF THE DRAWINGS

FIG. 1 is a partially cut-away side plan view of a "normally closed" embodiment of a shutter mechanism of the present invention.

FIGS. 2–4 are respective front, rear and top plan views of the embodiment of FIG. 1.

FIG. 5 is a top plan view of a sliced cylindrical core of an electromagnet for shutter mechanisms of the present invention.

FIG. 6 is an end view of the core of FIG. 5.

BEST MODE FOR CARRYING OUT THE INVENTION

Figure 7:
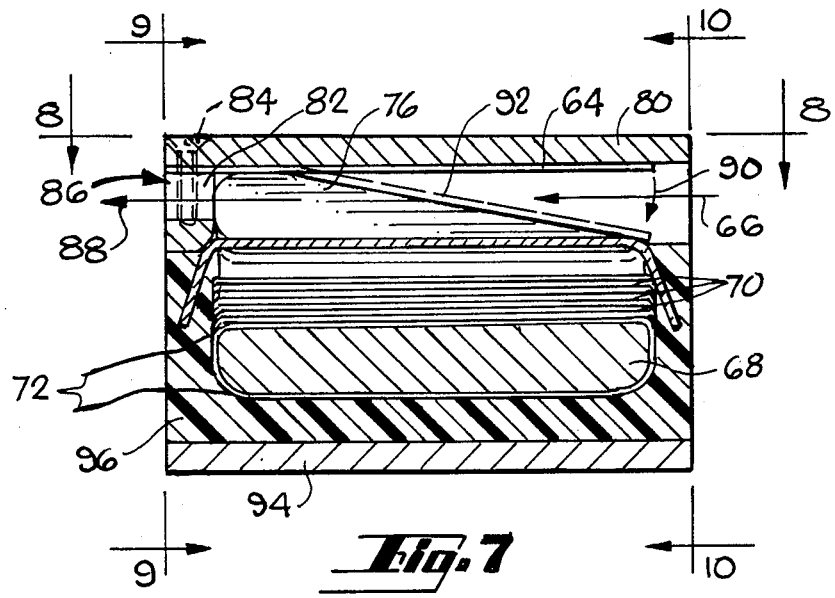
FIG. 7 is a side sectional view of a "normally open" embodiment of a shutter mechanism of the present invention.
Figure 8:
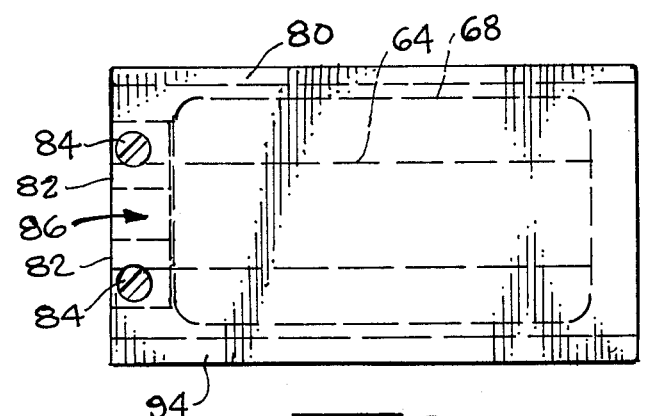
FIGS. 8–10 are respective top, front and rear plan views of the embodiment of FIG. 7.
Figures 9, 10:
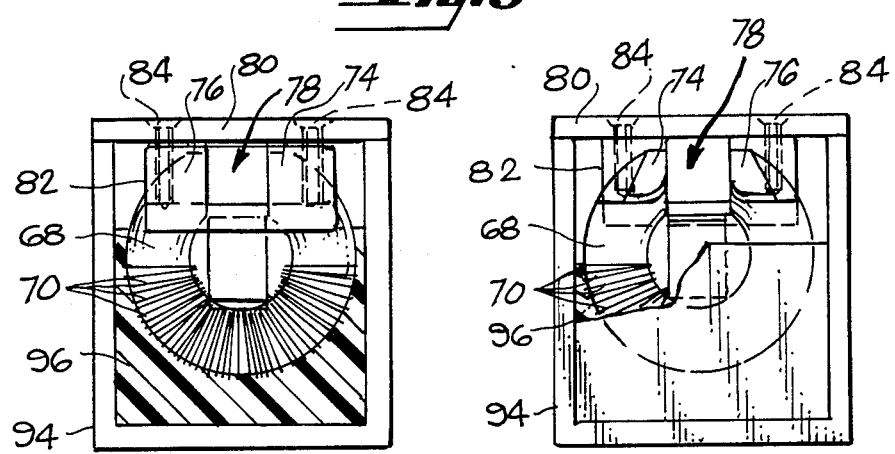
Figure 11:
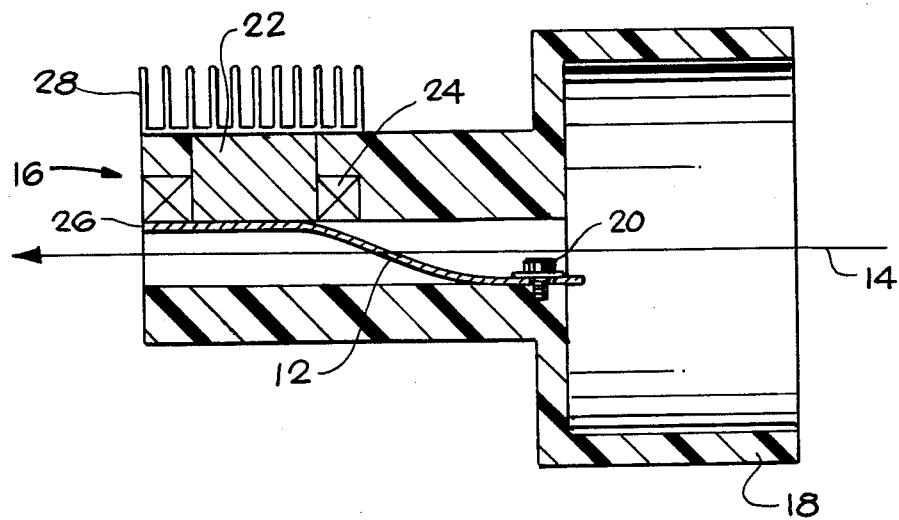
FIG. 11 is a side sectional view of a prior art shutter mechanism.

With reference to FIGS. 1-4, a "normally closed" embodiment of a shutter mechanism of the present invention includes a flat elongated ferromagnetic blade 30 oriented at near grazing incidence in the path of an incoming light beam 32 from a laser source. Typically, the angle of incidence of light against the blade 30 is about 84 degrees with respect to the normal to the blade surface. In this manner, the reflectance properties of grazing incidence are exploited, resulting in high reflectivity of light from the blade. Blade 30 may be coated with aluminum to further enhance reflectivity. For polarized light in the range from the near ultraviolet to the near infrared wavelengths, the reflectivity typically approaches 98%.

The shutter also includes an electromagnet comprising a core 34 wrapped with a wire winding 36. Core 34, seen in isolation in FIGS. 5 and 6, is a long cylinder with a lengthwise slice taken out, defining poles 38 and 40 with a channel gap 42 therebetween. The pole surfaces are machined to match the curvature of the blade's natural cantilever spring contour for the desired deflection. The core material is a magnetic grade iron with high permeability providing low hysterisis loss, and high efficiency. Returning to FIGS. 1-4, the winding 36 is wrapped toroidally, i.e. end-to-end around the core 34 so as to form a toroidal magnetic field when energized. Winding 36 communicates with an electrical power source via leads 44. Drive electronics, not part of this invention, control the duty cycle and frequency of the electric power supplied to the electromagnet. Typically, a drive voltage of from 15 to 30 volts DC is used.

Blade 30 is mounted flush against a backup plate 46. A blade retainer 48 secures the blade to back-up plate 46 with screws 50. A lengthwise slot 52 is cut out of backup plate 46. Slot 52 coincides with the beam path 32, and is normally covered by blade 30. A wedge-shaped thermal tongue 54 is disposed between the poles 38 and 40 of the electromagnet. Tongue 54 is preferably made from copper for high heat conductivity, and is chemically blackened for light absorptance. Tongue 54 is attached at an end to blade retainer 48, and is oriented so that a top surface of the tongue is level with the surface of poles 38 and 40 and approximately parallel to beam path 32.

In its normal "off" position, blade 30 and the electromagnet made up of core 34 and windings 36 are in a V-shaped relationship with the blade 30 and backup plate 46 defining one leg of the "V" and the inactive poles 38 and 40 of the electromagnet and tongue 54 defining the other leg of the "V", the light beam path 32 passing between the two legs generally parallel to the poles 38 and 40 and tongue 54. The high reflectivity of the blade 30 allows the optical power to be dumped to the thermal tongue 54, from which the resulting heat is channeled via thermally conducting epoxy 58 to the shutter's exterior case 56. Case 56 is typically aluminum for high heat conductivity. Any thermal energy absorbed by the blade can be transferred to the backup plate 46 by direct contact. Thus the blade 30 redirects the power and avoids temperatures which could change its spring temper. The heat from the magnetic winding 36 is channeled out via thermally conducting epoxy 58 inside the case 56 surrounding the electromagnet. Heat channeled to the case 56 can be handled by any of a variety of standard heat sink packages built around the case.

Optically, the V-shaped arrangement of blade 30 relative to magnetic poles 38 and 40 and tongue 54 causes the shutter to act as a light trap in the normally closed position. The fact that the blade is mounted at an end opposite that of the light source, i.e. opposite from the input side of the shutter, together with the grazing incidence of the light path 32 with the blade 30, means that the blade 30 and tongue 54 cause multiple scatter reflections to be absorbed in the narrow "V", resulting in nearly zero backscatter to the optical source. Blade 30 traps beam power in the shutter as it intercepts the beam, so there is no stray reflection.

In operation, when the toroidal winding 36 is energized and the electromagnet is accordingly activated, the electromagnet attracts the blade 30 downward toward poles 38 and 40, as indicated by arrow 60 in FIG. 1. Blade 30 flexes out of the way of beam path 32, allowing the beam to pass through the cutout slot 52 in backup plate 46, as indicated by arrow 62 in FIG. 1. A thermal elastomer, not shown, may be provided on poles 38 and 40 for cushioning the impact of the blade 30 against the poles. As indicated above, the poles 38 and 40 are machined to match the curvature of the blade's natural cantilever spring contour. The ferromagnetic blade 30 closes the magnetic circuit and becomes an essential part of the magnetics, making the toroidally wound cylindrical electromagnet extremely efficient and producing fast rise and fall times. The stiffness of blade 30 allows it to return quickly to the normal closed position once the power to the winding 36 has been shut off. Typically, a pulse repetition rate of up to 200 Hz can be achieved with optical rise and fall times of about 300 microseconds. The stiff retained blade combines with the contoured pole surface to give the blade a long lifetime exceeding one billion cycles. The straight through aperture provided by slot 52 has no optical elements or surfaces, and therefore does not alter the wavefront of coherent sources, such as lasers, when the shutter is open.

With reference to FIGS. 7-10, a "normally open" embodiment of the shutter mechanism includes a flat elongated ferromagnetic blade 64 oriented approximately parallel to the path 66 of an incoming light beam from a source, such as a laser. Typically, blade 64 is coated with aluminum for high optical reflectivity. The shutter also includes an electromagnet including a core 68 and wire winding 70. Winding 70 communicates with an electrical power source via leads 72. Drive electronics, not part of this invention, control the duty cycle and frequency of the electric power supplied to the electromagnet.

Core 68 is again a long cylinder with a lengthwise slice taken out. The slice defines poles 74 and 76 with a channel gap 78 therebetween. The core material is a magnetic grade iron with high permeability, and the core 68 is wrapped toroidally end-to-end by winding 70 so as to form a toroidal magnetic field when energized. The pole surfaces are machined to match the natural cantilever spring contour of the blade 64 when flexed.

Blade 64 is mounted flush against a backup plate 80. A blade retainer 82 secures the blade 64 to backup plate 80 with screws 84. Backup plate 80 does not have a slot cutout, and is preferably made from copper for high thermal conductivity and chemically blackened for optical absorptance. Blade retainer 82 has a channel 86 defined therein coinciding with gap 78 between the electromagnetic poles 74 and 76 so as to provide an aperture for the light beam 88. In its normally "on" position, blade 64 and the electromagnet are in a V-shaped relationship with the blade 64 and backup plate 80 defining one leg of the "V" and the inactive poles 74 and 76 of the electromagnet defining the other leg of the "V". The light beam path 66 and 88 passes between the two legs generally parallel to blade 64 through the gap 78 between poles 74 and 76 and through channel 86 of retainer 82.

In operation, when the toroidal winding 70 is energized, the electromagnet attracts the blade 64 downward toward poles 74 and 76, as indicated by arrow 90 in FIG. 7. Blade 64 flexes into the beam path 66, trapping the beam. A thermal elastomer, not shown, may be provided on poles 74 and 76 for cushioning the impact of the blade 64 against the poles. Blade 64 completes the magnetic circuit of the cylindrical core 68, making the electromagnet highly efficient.

Optically, the flexed blade 92, shown in phantom in FIG. 7, is oriented at a grazing angle of incidence, typically about 84° relative to the normal to the blade. The optical power is reflected by the blade 92 onto absorptive backup plate 80. Any thermal energy absorbed by the blade can be transferred to the magnetic poles 74 and 76 via the thermal elastomer, or conveyed through blade retainer 82 to the shutter's external casing 94. Heat from the magnetic winding 70 is channeled out via thermally conducting epoxy 96 to case 94. Flexed blade 92 and backup plate 80 form a narrow V-shaped light trap which prevents backscattering.

Both normally open and normally closed embodiments can sink over 10 watts of optical power without affecting the performance of the blade. High speed modulation, typically up to 200 Hz or higher, is achieved without backscatter or stray reflection. Long life of over 1 billion cycles is achieved because the stiff blade operates well below its cantilever spring elastic limit. The shutter is nonresonant and noninertial so as to allow rapid changes in duty cycle and frequency. The shutter is thus suitable for both high speed and high power laser pulse modulation.

I claim:

1. A shutter mechanism for shuttering a laser beam directed along a path from a source comprising,
    an electromagnet and flexible ferromagnetic blade mounted in narrow V-shaped relationship to one another at an end opposite from a light source, the electromagnet and blade lying with a light path passing between,
    said electromagnet communicating with an electrical power supply and having a cylindrical core and a toroidal winding about said core, said core having a lengthwise slice defining poles, a free end of said blade positioned to flex toward said poles when said electromagnet is active,
    means for absorbing light reflected from said blade, and
    means for dissipating heat from said absorbing means.

2. The shutter of claim 1 further defined by an elastomeric member disposed on said poles.

3. The shutter of claim 1 wherein said absorbing means is a light absorbing plate lying substantially parallel to said path on the opposite side of said blade from said electromagnet.

4. The shutter of claim 1 wherein said absorbing means is a light absorptive tongue disposed between said poles.

5. A shutter mechanism for shuttering a laser beam directed along a path from a source comprising,
    a plate with a slot therein lying in said path,
    a flexible ferromagnetic blade mounted at an end of said plate opposite from said source, said blade covering said slot,
    an electromagnet communicating with an electrical power source and having a cylindrical core and a toroidal winding about said core, said core having a slice substantially parallel to said beam path to define poles, a free end of said blade positioned to bend toward said electromagnetic poles when said electromagnet is active, thereby uncovering said slot,
    a light absorptive tongue disposed between said poles, and
    means for dissipating heat from said tongue.

6. The shutter of claim 5 further defined by an elastomeric member disposed on said poles.

7. The shutter of claim 5 wherein said blade is coated with a light reflective material.

8. A shutter mechanism for shuttering a laser beam directed along a path from a source comprising,
    a light absorptive plate lying substantially parallel to said path,
    a flexible ferromagnetic blade mounted at an end of said plate opposite said source,
    an electromagnet communicating with an electrical power supply having a cylindrical core and a toroidal winding about said core, said core having a lengthwise slice defining poles with a gap therebetween, said gap coinciding with said beam path, a free end of said blade positioned to flex toward said electromagnet when said electromagnet is active for blocking said beam, and
    means for dissipating heat from said light absorptive plate.

9. The shutter of claim 8 further defined by an elastomeric member disposed on said poles.

10. The shutter of claim 8 wherein said blade is coated with a light reflective material.

* * * * *